(12) United States Patent
Schuler et al.

(10) Patent No.: US 12,447,065 B2
(45) Date of Patent: Oct. 21, 2025

(54) METHOD FOR WINDING PREFORMS

(71) Applicant: Ruggli AG, Koblenz (CH)

(72) Inventors: Samuel Schuler, Basel (CH); Marco Auer, Leibstadt (CH)

(73) Assignee: Ruggli AG, Koblenz (CH)

( * ) Notice: Subject to any disclaimer, the term of this patent is extended or adjusted under 35 U.S.C. 154(b) by 149 days.

(21) Appl. No.: 18/285,309

(22) PCT Filed: Apr. 8, 2022

(86) PCT No.: PCT/EP2022/059526
§ 371 (c)(1),
(2) Date: Oct. 2, 2023

(87) PCT Pub. No.: WO2022/223330
PCT Pub. Date: Oct. 27, 2022

(65) Prior Publication Data
US 2024/0189157 A1      Jun. 13, 2024

(30) Foreign Application Priority Data

Apr. 21, 2021   (CH) .................................... 00426/21

(51) Int. Cl.
*A61F 13/20*      (2006.01)
*A61F 13/15*      (2006.01)

(52) U.S. Cl.
CPC .... *A61F 13/2094* (2013.01); *A61F 13/15666* (2013.01); *A61F 13/15699* (2013.01); *A61F 13/15764* (2013.01); *A61F 13/15804* (2013.01); *A61F 13/206* (2013.01)

(58) Field of Classification Search
None
See application file for complete search history.

(56) References Cited

U.S. PATENT DOCUMENTS

2021/0077308 A1      3/2021   Schuler et al.

FOREIGN PATENT DOCUMENTS

| CH | 714 846 A1 | 9/2019 |
|---|---|---|
| EP | 2 335 666 A1 | 6/2011 |
| WO | 2017/109166 A1 | 6/2017 |

OTHER PUBLICATIONS

International Search Report in PCT/EP2022/059526, mailed Aug. 10, 2022.

*Primary Examiner* — Barbara J Musser
(74) *Attorney, Agent, or Firm* — Collard & Roe, P.C.

(57) ABSTRACT

A method for winding preforms for the manufacture of tampons feeds a material tape. Strips in the form of tapes are separated from this material tape and pushed into a continuously rotating winding drum by at least one drive roller in such a way that the strip is positioned between a winding fork and a guide bar such that when the winding fork moves around the guide bar, the latter pushes a section of the strip into a fork gap of the winding fork and thus enables entrainment. Also, a corresponding device carries out the method.

21 Claims, 6 Drawing Sheets

METHOD FOR WINDING PREFORMS

CROSS REFERENCE TO RELATED APPLICATIONS

This application is the National Stage of PCT/EP2022/059526 filed on Apr. 8, 2022, which claims priority under 35 U.S.C. § 119 of Swiss Application No. 00426/21 filed on Apr. 21, 2021, the disclosure of which is incorporated by reference. The international application under PCT article 21(2) was not published in English.

The present invention relates to a method for winding preforms for manufacturing tampons from tape-shaped material, and a corresponding device for winding preforms, both according to the preamble of the characterizing claims.

TECHNOLOGICAL BACKGROUND

Tampons used for female hygiene, especially during menstruation, essentially consist of an absorbent material, usually a viscose wadding strip, which is first wound into the characteristic, elongated shape, then pressed and shaped. The preforms used to manufacture the tampons are rolls of strips of this strip-shaped material. The strips typically have a length of between 150 and 350 mm and a width of between 30 and 60 mm. As a rule, the materials used are connected to one another in a material connection, with thermally induced lamination usually taking place, in which a layered material is thermoplastically connected to the wadding. The resulting laminate tape is fabricated into the appropriate strip length and provided with a removal thread before being wound into a roll. The removal thread is usually folded over at right angles to the longitudinal axis of the laminate strip before the actual winding process.

In tampon production, high-volume production and high quality requirements play a major role. During the laminating process, the different dimensions of the wadding tape and the non-woven tape can add to the difficulty. Thus, certain tampon manufacturing methods are designed to create a proximal, end-side closure of the tampon by thermoplastically connecting a protruding area of the non-woven tape to the tampon surface around the removal thread at the distal end.

WO 2017/109166 A1 (Heege, T. et al.) describes a method for continuously providing strips of a laminate, which consist of two fiber materials. The fiber materials are moved closer to each other at different speeds and the second fiber material, after cutting to the appropriate tape length, is accelerated to the speed of the first tape material with simultaneous thermoplastic bonding.

This and similar manufacturing methods for laminate strips are known. The challenge lies in feeding the laminate strips to the subsequent processing unit without the need for an interposed intermittently operating transfer unit. In current methods, for example, a continuously produced laminate strip is placed on a winding needle in a stop-and-go process, which winds the laminate strip into a preform.

There is therefore a need for devices and methods for winding preforms for the production of tampons, which, after a continuous lamination and packaging of single-layer or multi-layer tapes, for example, still enable continuous further processing.

PRESENTATION OF THE INVENTION

It is thus an object of the present invention to provide a method and device for winding preforms for tampon manufacture which overcomes at least one disadvantage of the known art. In particular, a corresponding method and an associated device are to be provided which enable a continuous feeding of assembled strips of material into a continuous tampon manufacturing.

This object is achieved by the characterizing features of the independent claims.

One aspect of the present invention is a method of winding preforms to make tampons. The method according to the invention comprises a series of steps.

First, a material tape is supplied, in particular an endless material tape. Subsequently, tape-shaped material strips are separated from the material tape.

In the method according to the invention, a separated material strip is pushed into a continuously conveying winding unit by means of at least one drive roller in such a way that the material strip is positioned between a winding fork and a guide bar in such a way that when there is a relative movement between the winding fork and the guide bar, the latter presses a section of the material tape into a fork gap.

The method according to the invention makes it possible to connect a continuously operating winding unit directly to a continuously packaging and optionally laminating feed station without an intermittent step being required in which, for example, one of the work stations involved must be stopped to receive the workpiece. In particular, a contact-free transfer between a tape feed station and a winding station is guaranteed, for example in that no transfer gripper has to take the strip from the packaging and transfer it to the winding station. Furthermore, the method according to the invention makes it possible to manufacture pads in quantities that exceed those previously achieved. In particular, quantities of more than 140 pieces per minute are achieved, particularly preferably quantities of around 300 pieces per minute.

For the purposes of the present invention, a material tape can be understood, for example, as material consisting essentially of fiber material or comprising fiber material.

For the purposes of the present invention, a natural or synthetic material can be used as the fiber material, which is formed as a mesh or woven fabric of fibers and threads. Fibers made from a cotton fabric or a mixture of a cotton fabric and a viscose filament are conventional for tampon production. For example, a material band made of high-purity bandage wadding made of 100% viscose is suitable.

The material tape can be designed in one or more layers. Multiple layers of the same material can be present in layers, or different materials can be present in layers. The material tape can also only partially be made up of several layers, ie for example in that only partial sections are made up of several layers.

In a special embodiment, the material tape is a laminate tape. In this embodiment, a backing material is fed to at least a first draw roller. The backing material is preferably a fiber material. A layered material is also fed by means of at least a second draw roller. The layered material is preferably a thermoplastic non-woven fabric. The backing material and the layered material are brought together. A laminate tape is formed by laminating the backing material to the layered material. Tape-shaped laminate strips are separated from the laminate tape.

In this sense, in the case of a first backing material, its absorbent properties can be particularly important. The wadding is preferably a high-purity bandage wadding made from 100% cotton. Alternatively, a synthetic material can be used as the fiber material. However, the fiber material is preferably a viscose material. In this alternative embodiment, the wadding could be a high purity 100% viscose bandage wadding.

For the purposes of the present invention, the thermoplastic non-woven material can be understood to include corresponding non-woven materials made of polyethylene and/or polypropylene and/or polyester, or a corresponding mixture of one or more of these plastics, or a mixture of polyethylene and/or polypropylene and/or polyester with a fiber material. The materials can be selected in such a way that they deform in a specific temperature range and can thus form a material connection with the backing material.

In terms of the present invention, a laminate tape is produced by lamination. The laminate tape is characterized in that the laminated materials have entered into a material connection at least in sections, in particular over their entire contact surface. A material connection can exist in the sense of the present invention when the two materials are thermoplastically connected. Alternatively and/or in addition, this can also be the case if the materials are glued together, for example by means of an adhesive layer on one or both layered materials, or are fibers mechanically connected to one another, for example by combing and/or carding.

In a particular embodiment, bringing the backing material and the layered material together includes placing the two layers on top of one another, so that at least one surface side of the backing material is in contact with a surface side of the layered material.

In a particular embodiment, the backing material and the layered material are present as tapes, and the merging comprises a step in which the two tapes are guided congruently in the longitudinal direction. In this case, pressure rollers can be provided, which facilitate the merging.

In a particular embodiment, the merging only relates to part of the possible contact area. For example, a tape with an overlapping area can be brought together with the next tape, so that, for example, a surface area of the thermoplastic non-woven fabric does not lie on the fiber material, but remains as a free end. For the implementation of the method according to the invention, it is of secondary importance which material is at the top and which is at the bottom when merging.

In a particular embodiment, however, the backing material is guided to a point where the backing material is brought together with the layered material in such a way that the layered material is guided onto the backing material from below and the backing material thus rests on the layered material.

In a particular embodiment, the laminating of the backing material and the layered material to form a laminate tape comprises connecting these two tapes by applying energy, in particular heat.

In a particular embodiment, the laminating to form a laminate tape is carried out using at least one laminating roller.

In a further special embodiment, the lamination takes place immediately after the merging. The lamination preferably takes place by passing the two layers, the backing material and the layered material, between two rollers, it being possible for a laminating roller to be arranged opposite a counter-pressure roller. As an alternative to the counter-pressure roller, a counter-pressure plate or a pair of laminating rollers lying opposite one another can be provided.

In a particular embodiment, the thermoplastic non-woven fabric that forms the layered material is softened by the application of heat, so that it bonds to the cellulose of the fiber material.

In a particular embodiment, the laminating roller is a heatable roller. Alternatively, sufficient heat can also be applied by means of a hot air blower and/or by means of infrared radiation in order to carry out the lamination.

The lamination of the backing material and the layered material results in a laminate tape, which has fiber material on at least part of its surface and has, for example, a thermoplastic non-woven material on at least part of its opposite surface.

Of course, the device according to the invention and the method according to the invention can also be carried out with laminate tapes which comprise more than two different layers or have the said materials in multiples. For example, two layered materials can be brought together with the fiber material, so that both surfaces of the resulting laminate tape are at least partially covered with layered material.

By laminating a laminate tape from a backing material and a layered material, a tampon can be produced, for example, which has a more pleasant feel. The thermoplastic component, preferably a polyethylene/polypropylene mixture or a polyethylene/polyester mixture, can provide improved insertion of the tampon during use. The fibers are held together better, and if the thermoplastic non-woven material is positioned on the outside during the subsequent winding process, it prevents the cellulose fibers from sticking when they come into contact with moisture.

For the purposes of the present invention, both the backing material and the layered material can be processed as endless tapes. Accordingly, a distinction is made in the present application description between a tape and a strip, with a tape referring to an undefined length, while a strip is limited in its longitudinal extent.

In the context of the present invention, a material strip or a laminate strip is a tape area with a limited longitudinal extent. In other words, for example, a tape cut to certain lengths can result in a series of laminate strips or material strips. For the method according to the invention, these can have a length that is influenced by the desired diameter or the desired density of the tampon to be produced. Preferably the lengths are in a range of between 100 and 350 mm.

In the context of the present invention, a winding unit can be understood as a unit that is suitable for conveying a winding fork on an circulation path and for bringing it into self-rotation over at least part of this circulation path, so that a section of a material or laminate tape pressed into a fork gap can be wound up.

In a special embodiment, the winding unit is designed as a winding drum. Alternatively, the winding unit can also be designed as a winding tape.

In the context of the present invention, the winding drum can be understood to mean, for example, a unit with radially arranged winding forks. The winding forks can be moved along a circumference, for example in a direction of rotation of the winding drum, and thereby be made to rotate about their own longitudinal axes at least in sections.

In the context of the present invention, a roller is to be understood as a substantially cylindrical, circular or roller-shaped arrangement which, when rotated about its axis of rotation, describes a curve along its circumference. However, rollers according to the invention do not necessarily have to have a circular cross section. What is decisive for the function of the roller is an essentially circumferential outer surface, which can be rotated around a fixed point. Thus, some of the components referred to as rollers in the present invention can also be designed as circulating conveyor belts.

In a particular embodiment, the drive roller is a substantially cylindrical roller which can be driven perpendicular to its radius of rotation so that the roller is subject to torque.

A particular advantage of the present invention is that the drive roller pushes the laminate strip into the winding drum. As a result, no component is required which must act between the continuously rotating, drum-like winding drum and the supply of the laminate tape. The pushing action can be further improved by said drive roller, for example by using a ribbed, grooved and/or roughened surface to improve static friction with respect to the laminate strip, in order to move this laminate strip in a conveying direction.

More preferably, the drive roller is controlled to rotate at a specific speed. The speed is preferably chosen so that the laminate strip is accelerated into the winding drum. In particular, the laminate strip should be accelerated relative to the speed of the material or laminate tape on the feed side of the drive roller.

More preferably, the speed of the drive roller is selected such that the acceleration of the material or laminate strip into the winding drum is sufficient to position it between the guide bar and a radius of rotation of the winding forks.

In a particular embodiment, the guide bar is designed as a bolt formed at right angles to the longitudinal axis of the laminate strips, in particular with a substantially cylindrical circumference. The round circumference prevents the material or laminate strips from roughening up on the surface of the guide bar or being otherwise damaged in terms of material.

In a further particular embodiment, the guide bar has a transverse profile which is designed to substantially prevent roughening of the laminate strips on the surface of the guide bar. For this purpose, the guide bar can have, for example, a transverse profile which is essentially teardrop-shaped or hydrofoil-shaped, with a rounded surface preferably being formed on the end face in the direction of rotation of the winding forks.

In the method according to the invention, the winding forks can rotate about their own longitudinal axes. At the same time, they rotate around the axis of rotation of the winding drum.

In a special embodiment, the winding forks pause their own rotation when passing the guide bar. During the subsequent rotational movement along the radius of rotation of the winding drum, the winding fork resumes its own rotation and the material or laminate strip is wound up.

In a particular embodiment, the winding fork passes the guide bar by passing it through the middle of two winding fork fingers. This particularly preferably takes place with the winding forks paused, ie while the self-rotation of the winding forks is paused. After passing the guide bar, the self-rotation can be resumed and the laminate strip can be wound up in this way.

In a special embodiment, the guide bar performs a movement counter to the direction of rotation of the winding fork and back. This can be done, for example, by designing the guide bar to perform a stroke. The stroke is particularly preferably synchronized with the rotational speed of the winding forks, so that a complete stroke particularly preferably takes place in the period of time that the winding fork needs to pass the guide bar. As a result, the guide bar assists in inserting the strip of laminate into the winding fork and allows for faster operation by allowing the rotation speed to be increased. A further advantage of the stroke can be expressed by the fact that the self-rotation of the winding forks can take place over a longer period of time; for example, by earlier threading the period of time during which winding can take place can be prolonged. In particular, the winding fork can resume its self-rotation earlier, for example, and start winding the material or laminate tape.

In a particular embodiment, the method according to the invention includes a weakening step in which the material tape is given a predetermined tear point. This can be done, for example, by the material tape running through a perforation step before a material strip is separated by the drive roller.

In a particular embodiment, the method according to the invention comprises a perforation step in which the backing material is perforated. The backing material is preferably perforated before the backing material and the layered material are brought together.

In a particularly preferred embodiment, this perforation of the backing material includes a weakening of the backing material by creating a predetermined tear point. This can be achieved in particular by means of specially adapted rollers which cut recesses in the laminate tape by means of teeth.

In a particular embodiment, the layered material is also perforated. The layered material is preferably perforated before the backing material and the layered material are brought together. Similar to the backing material, this can be accomplished with an additional punching roller, which punches corresponding recesses into the backing material as a later predetermined breaking point. In this particular embodiment, between the perforation of the layered material and the merging of the backing material and the layered material, a further driven roller is provided, which accelerates the layered material with respect to the conveying speed on the inlet side of this further drive roller. This acceleration can cause the layered material to tear off.

In a special embodiment, on the inlet side of the drive roller, the laminate tape is a continuous tape of backing material with spaced-apart perforations, onto which individual strips of the layered material are already laminated.

In a special embodiment, the laminate tape is separated into laminate strips by the drive roller. A rotational speed of the drive roller can be selected in such a way that it accelerates the laminate tape compared to the conveying speed on the inlet side. As a result, a laminate strip is torn off the laminate tape and separated. The desired length of the laminate strips can be gradually adjusted by a person skilled in the art by selecting and controlling the drive roller, which represents a further advantage of the present invention.

In a special embodiment of the method according to the invention, the winding fork rotates counterclockwise around its own axis.

In another special embodiment of the method according to the invention, a removal thread is wound around the material or laminate tape on the inlet side of the drive roller. This is preferably folded at right angles to the longitudinal axis of the material or laminate tape.

In a further particular embodiment, the material or laminate strip is wound by continuing the rotational movement of the winding fork after a portion of the material or laminate strip has been pressed into the fork gap. The winding can take place, for example, using a guide curve along which the self-rotation of the winding forks winds up the material or laminate strip. The guide curve can in particular be designed in such a way that it accompanies the entire winding process, and its curve radius is therefore preferably selected in such a way that it essentially corresponds to the strip length to be wound.

The winding drum preferably rotates about an axis of rotation which is aligned horizontally. The rotation of the winding drum is preferably clockwise. The winding forks are thus fed clockwise to the guide bar, with the winding forks themselves rotating counterclockwise about their axis of rotation and moving around the guide bar in such a way that a piece of laminate strip conveyed between the guide bar and the winding fork is pulled along and later wrapped.

In a special embodiment, the winding fork is guided past a closing station which closes the roll. This can be a thermoplastic closing, analogously to what was described above with regard to the laminate or the lamination. In particular, this closing can take place by thermoplastically connecting a surface portion of a thermoplastic non-woven fabric that is not placed on the fiber material during lamination, but rather remains as a free end, to the roll. Analogously and/or additionally, this can also be accomplished with another method for material connection. The same method is preferably used here as before when producing the corresponding laminate tape, for example a method selected from the group consisting of: combing, gluing and felting. In the context of the present invention, the roll can be closed by materially connecting the portion that is not placed on the fiber material during lamination to the roll produced.

In a further special embodiment, the winding fork is guided past an "anti-telescoping module" in which a region of layered material that may overlap the backing layer is formed in such a way that a proximal end is achieved on the finished tampon.

With the method according to the invention, a continuous scalable production can be accomplished. Due to the design of the drum, the individual process steps, such as winding and/or closing, are still given enough time to obtain high quality.

In a special embodiment, a suction force acting coaxially to the winding forks is exerted on the winding forks along the entire winding process in the winding drum. In this way, for example, a folded-back removal thread can be stabilized in the course of processing. This can be done, for example, via suction pipes.

The method according to the invention can easily be adapted to different tampon sizes. The tampon size can be controlled by controlling the separation steps. Matched perforations and acceleration of the drive roller make it possible to obtain tapes of the desired length. At the same time, for example, the guide curve can be designed to be exchangeable, so that it can be adapted to a corresponding winding length.

The winding forks and the guide bar can also be exchanged in terms of their fork gap and guide bar diameter, so that different tape haptics and thicknesses can be accommodated.

A further aspect of the present invention relates to a device for winding preforms for the production of tampons. The device is preferably suitable for carrying out the method described above.

The device comprises a conveyor device for feeding a material tape, in particular an endless material tape.

It also includes a separating unit for separating tape-shaped material strips from the material tape, and a drive roller for pushing the laminate strips into a winding unit. In a particularly preferred embodiment, the drive roller acts on the separating unit, for example by conveying at a speed that is higher than the speed at which the conveyor device feeds the material tape.

In a particular embodiment, the material tape is designed as a laminate tape, as explained above. The device then comprises a first draw roller for feeding a backing material, in particular a fiber material. The draw roller can be provided with teeth, tines and/or roughening, for example, which increase static friction of the roller with respect to the backing material. The draw roller is driven so that as it rotates about its axis of rotation, it feeds the backing material from a backing material roll.

In a particular embodiment, a roll magazine is provided which includes a series of backing material rolls. Special backing material buffers can be used when a backing material roll runs out so that another roll is fed in seamlessly, so that the continuous production process does not have to be interrupted to replace the backing material rolls. Analogously, this can also be provided for rolls of layered material. This is because the device according to the invention comprises a second draw roller for feeding in a layered material, in particular a thermoplastic non-woven fabric. In this case, this second draw roller can be designed analogously to the first draw roller with appropriate conveying aids. The device according to the invention also includes a laminating unit for laminating a laminate tape made of the backing material and the layered material.

In a special alternative embodiment, the roll magazine comprises at least one backings magazine in which the backing material is arranged in layers.

In a particular embodiment, the laminating unit is a heatable roller. In addition, a corresponding counter-roller is preferably arranged, which is able to exert a contact pressure on the heated roller, so that a tape of backing material and layered material guided between the two rolls is laminated to form a laminate tape.

Alternatively, the lamination can also take place using non-heated rollers, which are heated at the pressure point by means of induction, such as an infrared radiator.

In an alternative further embodiment, the lamination only takes place by pressing, in that the materials of the backing material and the layered material are designed in such a way that they can form a material connection by themselves. For example, the layered material may be provided with an adhesive and/or adhesive layer that bonds to the backing material. It would also be conceivable to induce adhesion beforehand. This can be done, for example, by heating a layered material before merging, for example using an infrared radiator, which activates adhesive properties on the layered material and/or the backing material, and then the two materials only have to be pressed together when they are brought together.

The device according to the invention further comprises a separating unit for separating tape-shaped laminate strips from the laminate tape. In addition, it includes at least one drive roller for pushing the laminate strips into a rotatable winding drum. Possible functional configurations for the drive roller have already been described above. The drive roller can be pressed onto the laminate tape via a drive roller lever so that there is an optimal conveying effect. The drive roller lever can also be designed simply to lift the drive roller from the laminate tape as required, with the laminate tape not functioning and the tape not being pushed any further into the winding drum.

In a particular embodiment, the drive roller lever is designed to carry out pressure equalization.

The device according to the invention further comprises a winding unit which has a plurality of winding forks. These winding forks are arranged in such a way that they can be guided past a guide bar that is stationary or movable with respect to the conveyance of the winding unit. This can be accomplished, for example, in that the guide bar extends from a stationary holder for the guide bar into the conveying space of the winding forks. Alternatively, the guide bar can be movably mounted, for example by providing a pivotable lever bar which interacts with a gear for holding the guide bar in the conveying space of the winding forks. The guide bar is particularly preferably designed to carry out a stroke.

In a special embodiment, the winding unit is designed as a winding drum. The winding drum has a plurality of winding forks. These winding forks are arranged in such a way that they can be guided past a guide bar that is stationary or movable with respect to a rotation of the winding drum. This can be accomplished, for example, in that the guide bar extends from a stationary holder for the guide bar into the rotation radius of the winding forks. Alternatively, the guide bar can be movably mounted, for example by providing a pivotable lever bar which interacts with a gear for holding the guide bar within the rotation radius of the winding forks. The guide bar is particularly preferably designed to perform a stroke, in particular the stroke comprising a movement counter to the direction of rotation of the winding drum and back.

The radii of rotation of the winding forks are designed in such a way that a fork gap of the winding forks allows the guide bar to pass through without contact during the rotational movement of the winding drum. Correspondingly, in the device according to the invention, the winding forks can be guided past the guide bar in such a way that a laminate strip pushed into the winding drum is pressed by the guide bar in a fork gap and is thus entrained by the winding fork. The self-rotation of the winding forks can preferably be paused while they are guided past the guide bar in this way.

In a special embodiment, a running plate can be provided, on which the at least one drive roller pushes the material or laminate strip into the rotatable winding drum. This running plate can be provided with a recess which allows the winding forks of the running plate to be passed.

In a special embodiment, the size of this recess in the running plate is chosen so that it corresponds to the surface area of the material or laminate strip placed on the guide bar by the winding fork.

In a particular embodiment, the at least one drive roller is at the same time the separating unit for separating strips of material or laminate from the material or laminate tape. Examples of how this can be carried out have already been described above in connection with the method according to the invention.

In a particular embodiment, the device according to the invention comprises a guide curve, along which the winding forks can wind up the material or laminate strip in their movement along the rotation radius of the winding drum. This guide curve is preferably designed to be exchangeable, so that its curve radius and curve length can be adapted to the dimensions of a material or laminate strip.

In a particular embodiment, the winding forks are designed in such a way that they can be rotated about their own longitudinal axis, ie they can be made to rotate of their own accord. The winding forks can preferably be driven for this purpose, particularly preferably they can be driven individually.

For this purpose, for example, gears can be provided which transform a rotational movement of the winding drums via a gear system into a rotation of the winding forks. The individual winding forks are preferably designed in such a way that they can be driven to rotate individually. In this way, for example, pausing the rotation of the winding forks can be coordinated with the passage of the guide bar, and the self-rotation can then be resumed during the winding process.

In a particular embodiment, the device further comprises at least one guide roller each for stabilizing the backing material, the layered material and the laminate tape. In order to constantly ensure good tape and material tape tension, guide rollers can be provided, which on the one hand prevent a lateral shift, i.e. a shifting at right angles to the longitudinal extent of the belt, and on the other hand ensure the necessary tape tension by exerting a certain tensile force on the tape, via springs.

In a special embodiment, the winding drum includes a further closing station. This further closing station can be used to close and stabilize a roll.

In a further special embodiment, the winding drum includes an anti-telescoping module, as described above.

The guide bar is preferably designed to carry out a stroke movement without a stop. In a particularly preferred embodiment, an eccentric is provided to complete the stroke. As a result, the movable guide bar can perform the stroke at a high frequency synchronously with the respective passing of a winding fork.

It goes without saying for a person skilled in the art that all non-exclusive embodiments can be implemented in any combination according to the invention, for example also through device features that result from method features and vice versa.

With the method according to the invention and the associated device, it is possible to ensure continuous processing of material and/or laminate tapes to form preforms. The methods are scalable and can take place in continuous operation. Further advantages of the device according to the invention have already been described at the outset or in connection with special embodiments. It goes without saying for a person skilled in the art that in an embodiment according to the invention of a method for producing preforms of tampons, as well as a device according to the invention, the features described can be implemented in any combination provided they are not mutually exclusive.

The invention is now explained in more detail below with reference to specific exemplary embodiments and figures, without being restricted to these. For the sake of simplicity, the same elements are given the same reference numbers in the figures. The figures schematically present the inventive concepts and are not intended to be to scale.

DESCRIPTION OF THE DRAWINGS

Exemplary embodiments of the invention are described with reference to the following figures.

In the Drawings:

FIG. 3c shows the continuation along the radius of rotation of the winding drum;

MODES OF CARRYING OUT THE INVENTION

Figure 1:
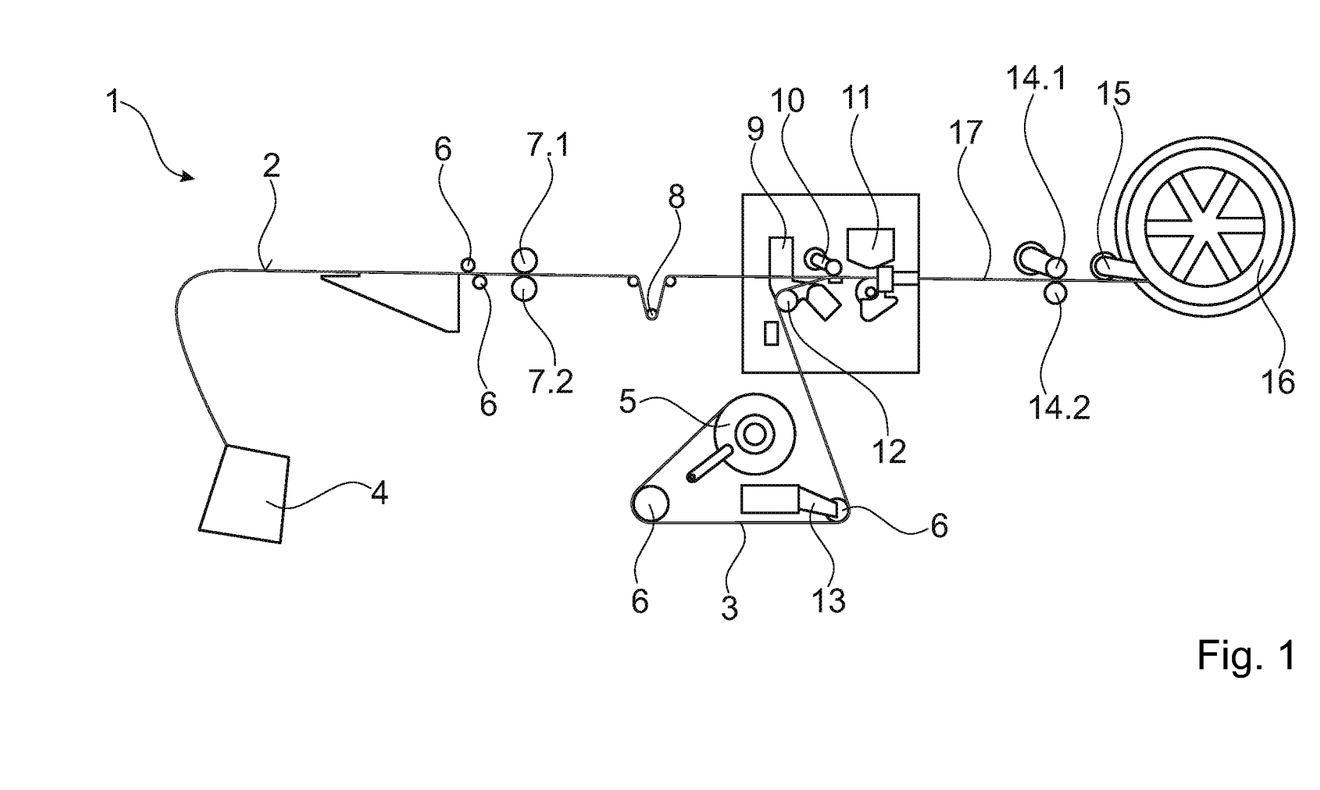
FIG. 1 shows a schematic overview of the device according to the invention.

FIG. 1 shows schematically how a device according to the invention can be constructed. In this schematic view, a conveying movement takes place from left to right. Two tape-like materials are brought together, welded and fed to a winding drum 16 as a laminate tape. The backing material 2 comes from a backing material roll 4, from which the backing material 2 is fed by continuous pulling. The tension on the rotatably mounted backing material roll 4 comes from a first draw roller 7.1, which exerts a tensile force on the backing material tape 2 by rotating about its axis of rotation. In the present exemplary embodiment, the first draw roller 7.1 is opposite a counter-pressure roller 7.2, between which the tape of the backing material 2 is guided. The counter-pressure roller 7.2 can also be driven, whereby in a special example two first draw rollers 7.1, 7.2 would be responsible for the necessary tension on the tape. In the present example, the backing material 2 is a wadding tape made of cotton cellulose fibers. The backing material 2 forms the main absorbent material for absorbing liquid in the later tampon.

For special applications, such as certain homeostatic or medical tampons, a swelling effect is of undesirable or secondary importance. In these examples, the backing material 2 is selected differently. In the case of medical tampons which are designed to release an active substance, the backing material can already be provided with the corresponding active substance at this point in time. It is also possible to apply the active substance to the finished tampon product to a later time. A row of guide rollers 6 can be provided along the entire conveying direction up to the winding device 16, which stabilize the tape guidance and prevent a lateral displacement of the corresponding tape. In the present example, a pair of guide rollers 6 is formed on the inflow side of the first draw roller, which ensure that the strip width is fed essentially horizontally to the first draw roller 7.1.

In addition to guide rollers 6, the tension in the tape can be ensured by means of compensating rollers 8 attached along the belt section. Adequate tape tension guarantees that the operative engagement of the drive and draw rollers conveys the corresponding tape optimally, and that the tools acting on the tape can always work on an essentially smooth tape surface. In the present example, the compensating roller 8 is arranged after the first draw roller 7.1 in the direction of travel of the tape. In this case, the compensating roller 8 can be provided with a spring, an actuator or another tape compensation means which are able to exert a corresponding restoring force on the belt.

In the present specific example, the compensating roller 8 is designed to be spring-loaded, so that it exerts a restoring force on the tape tensioned by it, which force is proportional to the spring force. The backing material 2 is conveyed further to a perforation unit 9. In the present example, this perforation unit 9 is used to punch weakening points in the backing material 2.

For this purpose, the perforation unit 9 can be provided, for example, as a toothed cylinder that has one or more cutting teeth along its radius of rotation, which correspondingly perforate the backing material 2 during the rolling movement. Alternatively, a cutting knife running at right angles to the running direction of the tape and pivoting back and forth in alternation can also be provided in order to enable the necessary weakening of the backing material 2.

During the continuous supply of the backing material 2 to the perforation unit 9, a layered material 3 is reeled off from a layered material roll 5 simultaneously and continuously. Alternatively, a layered material magazine can also be provided, in which the layered material is stored in layers, such as folded like an accordion.

In the present example, the layered material 3 is a thermoplastic non-woven material which has a polyethylene/polypropylene mixture. The materials may have to be taken into account by arranging special guide rollers. In the present example, for example, an arrangement of further guide rollers 6 for the supply of the layered material 3 can take into account the elasticity of the thermoplastic non-woven of the layered material 3, which differs from the wadding tape of the backing material 2.

In the present concrete exemplary embodiment, a first guide roller 6 is arranged directly after the roll of layered material and then a tape tension lever 13 with a connected guide roller 6 is provided. This tape tension lever can be resiliently pivoted so that it helps to maintain appropriate tape tension. A second draw roller is provided for unwinding the layered material 3 from the roll of layered material 5 and conveying it in the direction of the backing material 2. Possible configurations of such draw rollers 7.1, 12 are basically known to a person skilled in the art. In a concrete example, the draw rollers 7.1, 12 can have roller circumferences that have a corresponding surface structure in order to facilitate the conveying process. A profiling of the roller surface has proven particularly useful. For example, grooves, teeth or roughening on the roller surface can facilitate the conveying process. Such configurations are known to those skilled in the art.

In the present view, the layered material 3 reaches the backing material 2 from below. However, this is not a prerequisite. It is also conceivable that the layered material 3 is guided onto the backing material 2 from above, with minor adjustments also having to be made as the process progresses. The two tapes 2, 3 are physically contacted with one another via a pressure roller 10, so that a surface of the backing material 2 is at least partially covered by the layered material 3. Following the pressure roller 10, which, in addition to driving the layered material tape through the backing material 2, can also provide a cutting device for the layered material 3, the contacted tapes 2, 3 reach the laminating unit 11.

In another embodiment, the cutting of the layered material takes place directly after the second draw roller 12 in the direction of tape travel (not shown). In the present example, the laminating unit 11 is designed to apply a corresponding amount of heat to the two tapes, so that they are materially connected by the thermoplastic softening of the layered material 3.

A laminate tape 17 that has now been created has two layers, namely a wadding layer and a thermoplastic non-woven layer. The laminate tape 17 is guided via a conveyor roller 14.1 and its corresponding counter-roller 14.2 to a drive roller (not shown in this figure), which is pressed onto the laminate tape 17 with the necessary force via a drive roller lever 15 and in since its rotational speed is faster than that of the conveyor roller 14.1, it generates an acceleration of a laminate tape part, which forms a laminate strip therefrom by tearing the predetermined breaking point or weakening point. This laminate strip is further processed in the winding drum 16.

The entire course of the process of the present device can take place continuously. For example, magazine-like rolls can enable a seamless transition and enable the backing materials 2 and layered materials 3 to be fed continuously as a tape.

Figure 2:
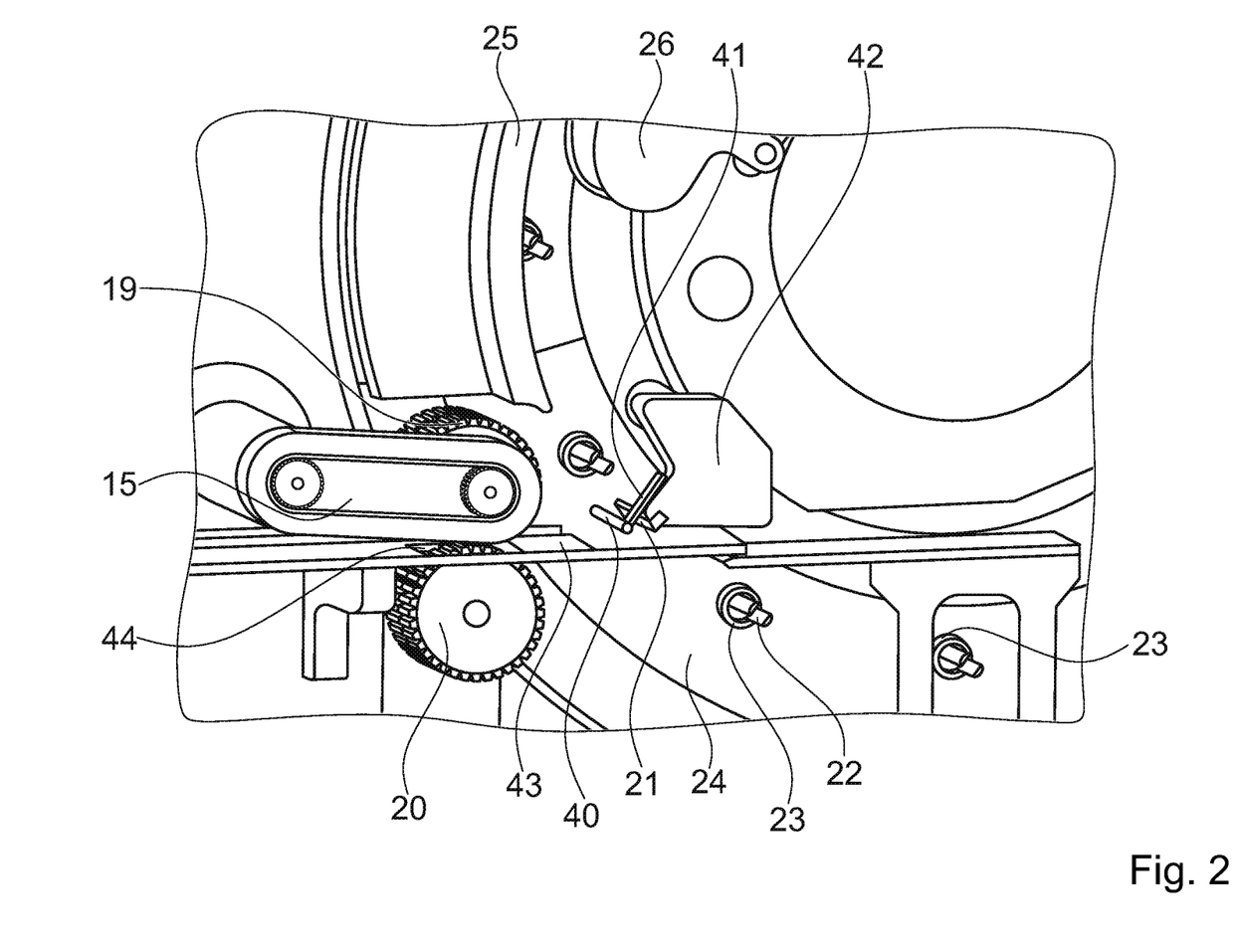
FIG. 2 schematically shows a transfer area into a winding drum.

FIG. 2 schematically shows the transition point of the laminate strips into the winding drum, the inner workings of the winding drum 16 being shown for better illustration. As previously mentioned, the laminate tape passes through the conveyor roller to the drive roller 19. The drive roller 19 is mounted by means of the drive roller lever in such a way that it can be brought into operative connection with the laminate tape. If an active connection is created, a piece of the laminate tape is cut off due to its relatively higher rotational speed around its axis of rotation and conveyed into the winding drum as a laminate strip. In the present example, the drive roller 19 is supported by a counter-pressure roller 20 that is also driven.

When it is fed into the winding drum 16, the laminate tape is guided on a running plate 43 which has a running plate recess 44 through which the counter-pressure roller 20 can come into operative connection with the laminate tape. With this roller arrangement, the laminate strip is practically pushed into the winding drum without the need for a physical mechanical lever or transfer unit to gradually convey the laminate tape into the winding drum. As a result, the winding drum 16 can also be operated continuously, and higher process speeds are possible. When the laminate strip is pushed into the winding drum 16, at least a part of its surface passes between a guide bar and a rotation radius of the winding forks 22 arranged radially along the circumference of the winding drum 16.

The winding forks 22 rotating in this drum circumference come into operative connection with the laminate strip as a result of their movement and guide this strip around the guide bar 21 by means of their own rotation. The guide bar 21 presses part of the laminate strip into a winding fork gap of the winding forks 22, as a result of which these are able to convey the laminate strip along with them. A replaceable guide curve 25 made of plastic is also provided in the winding drum, which serves as a counter surface for the winding of the laminate strips around the winding forks. The winding forks 22 rotating about their own axis are arranged on a rotary disc 24. Furthermore, the winding drum 16 can be provided with additional processing units. In the present example, a closing station is provided, for example, which closes the finished rolls by means of a thermal, material connection of the thermoplastic material, in the same way as was done with the layered material.

The guide bar 21 is arranged so that it protrudes into the radius of rotation of the winding forks on the winding drum. For this purpose, a holder for the guide bar 42 is provided in the present example, which holds the guide bar 21 by means of a web 41 perpendicular to the longitudinal direction of the laminate strips and parallel to the axis of rotation of the winding drum. The winding forks 22 can have their own drive for self-rotation and are surrounded by sleeves 23.

Alternatively, the guide bar 21 can also be arranged to be movable, for example by making the web actuable, for example to perform a stroke, so that the guide bar as a whole is able to perform a movement counter to the direction of rotation of the winding fork 22 and back.

In order to illustrate the entrainment of the laminate strips 18 by the winding forks 22, the process is shown again schematically and in simplified form in FIGS. 3a to 3d. In this case, these figures are only intended to illustrate the individual steps, without claiming to present the precise alignment of the winding forks at a specific point in time in the process.

Figure 3A:
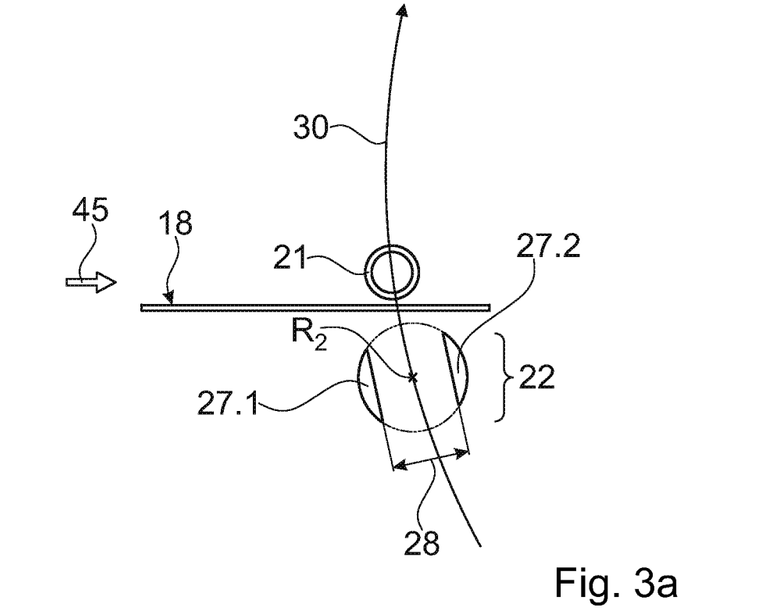
FIG. 3a schematically shows a winding fork approaching a laminate strip.

FIG. 3a shows how the laminate strip 18 enters the effective range of the guide bar 21 and of the winding fork 22 moving along a rotation radius 30 of the winding drum. In the present example, the winding fork 22 comprises two winding fork fingers 27.1, 27.2, which define a fork gap 28 in between. A rotation axis R2 of the winding fork 22 moves along the rotation radius 30 of the winding drum. In operation, the winding fork 22 is configured to rotate about its axis of rotation R2. Although a winding fork 22 with two winding fork fingers 27.1, 27.2 is shown in the present example, embodiments with more than two winding fork fingers are of course also possible. A system with three fingers is just as conceivable as an arrangement with numerous individual spikes as fingers. The guide bar 21 is arranged in the course of the rotation radius 30 such that when the winding forks 22 rotate about the rotation radius 30 while rotating about the rotation axis R2, they pass the guide bar 21 without contact it. For this purpose, the winding fork 22 can pause its self-rotation for the period of time that the winding fork needs to pass the guide bar.

Figure 3B:
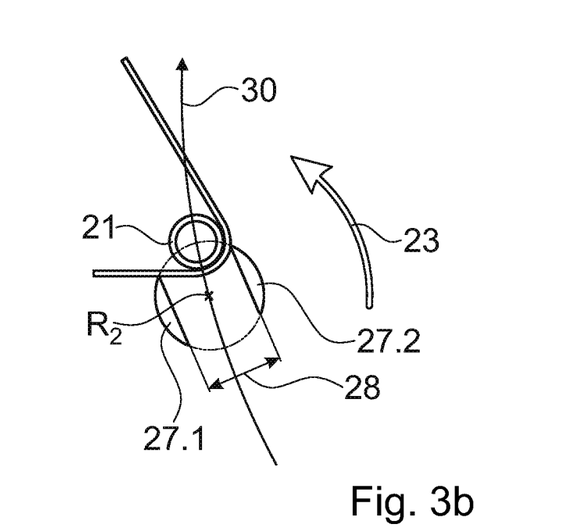
FIG. 3b shows the winding fork contacting the laminate strip.

In FIG. 3b, a winding fork 22 has paused its self-rotation and has already come into contact with part of the laminate strip 18 in such a way that a winding fork finger 27.2 bends part of the laminate strip around the guide bar. The rotation of the winding fork 22 about its axis of rotation R2 in the counterclockwise direction 23 is paused.

Figure 3C:
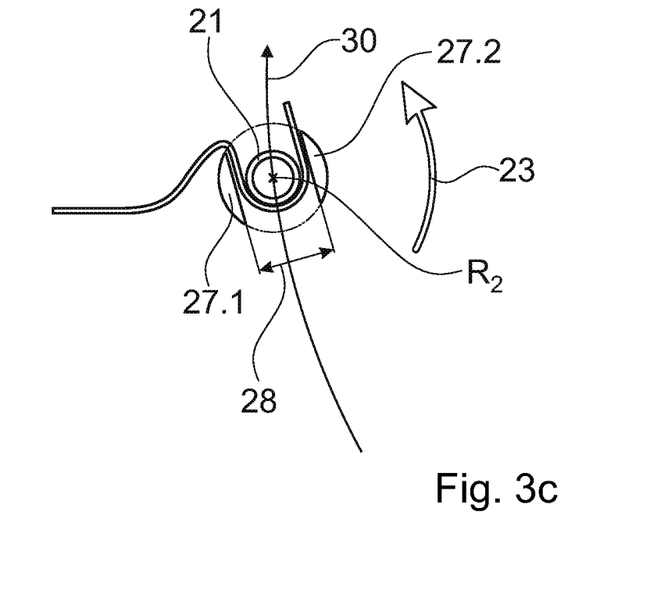
FIG. 3c shows the bending of part of the laminate strip around the winding fork.

In FIG. 3c, the winding fork fingers 27.1, 27.2 are at the same level as the guide bar. The winding forks 22 are designed in relation to the guide bar 21 in such a way that one fork gap 28 is sufficient to pass the guide bar without contact. While the winding fork 22 passes the guide bar 21 without contact, in that the two winding fork fingers 27.1, 27.2 are guided around the guide bar 21 on the rotational circulation path, part of the laminate strip 18 is pressed by the guide bar 21 between the two winding fork fingers 27.1 and 27.2. The rotation of the winding fork 22 about its axis of rotation R2 in the counterclockwise direction 23 is paused.

Figure 3D:
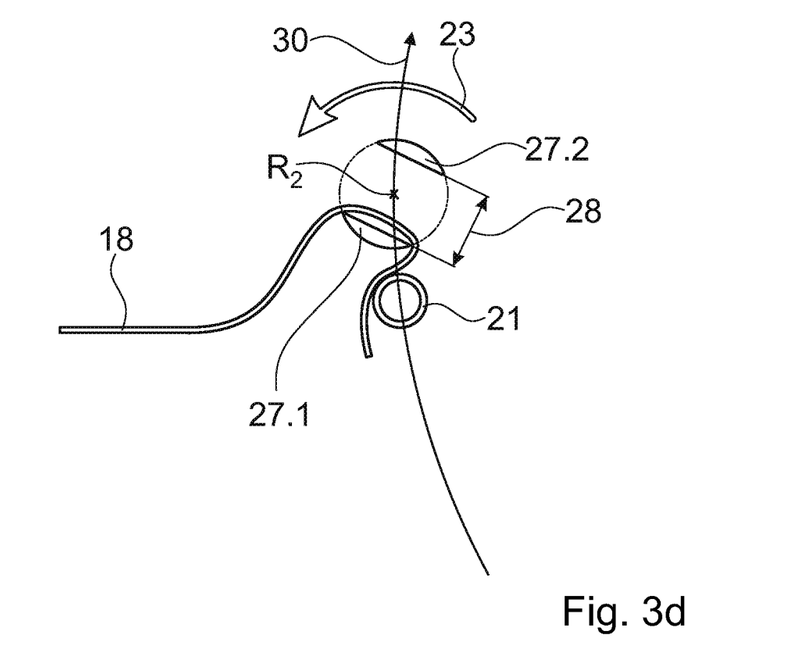
FIG. 3d shows schematically the start of the winding process by the winding fork.

In FIG. 3d, the winding fork 22 has passed the guide bar 21 completely. As the winding fork 22 continues to move, the laminate strip 18 is drawn further. The winding fork 22, which is now again rotating counterclockwise 23 about its axis of rotation R2, now winds the laminate strip around the winding fork fingers 27.1, 27.2 and pulls it past the guide bar 21. The laminate strip remains hanging with a loop in at least one winding fork finger 27.1. As a result, the laminate strip is completely wound up in the following further movement.

Figure 4:
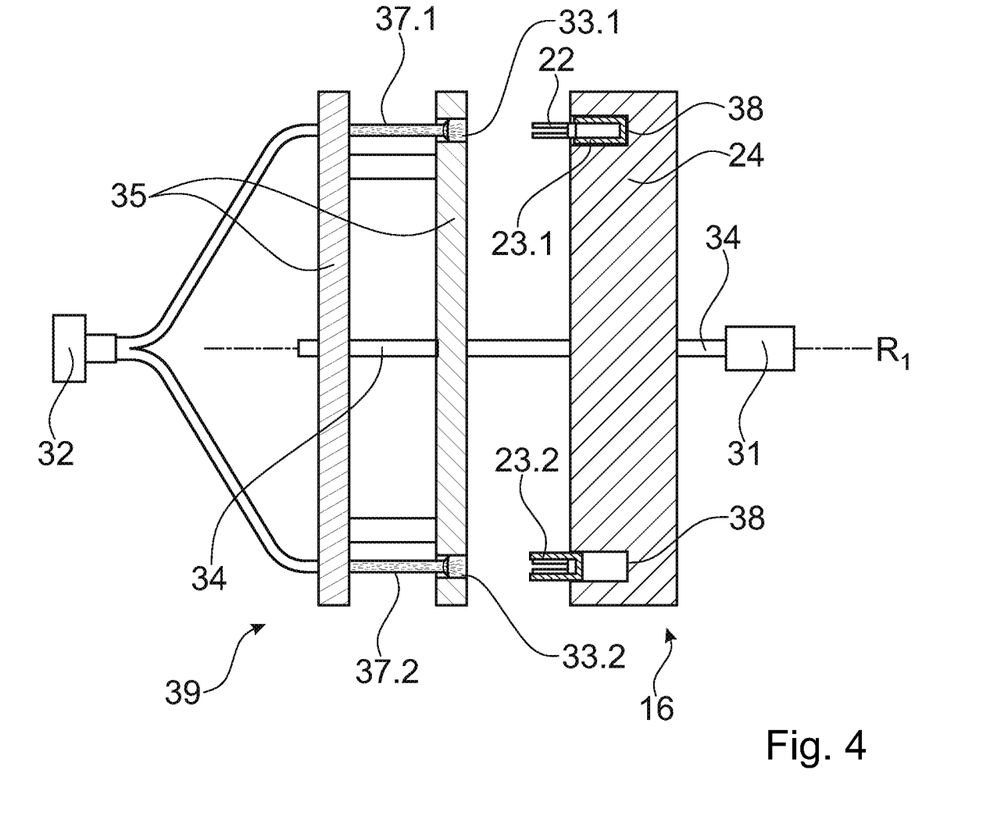
FIG. 4 shows a schematic cross section through the winding drum and the ejection drum.

A further advantageous embodiment of the present invention is shown in FIG. 4. FIG. 4 schematically shows a cross section through a winding drum 16 and a suction drum 39 associated therewith. The winding drum 16 is mounted to be rotatable about an axis of rotation R1 by a drum drive 31 through a drum axis 34. The winding drum 16 has radially arranged winding forks 22 along its circumference. These winding forks 22 are arranged in such a way that they project into an intermediate space between the winding drum and the suction drum 39. The winding forks 22 are arranged on a rotary disc 24. In corresponding depressions of the rotary disc 24 22 sleeves 23.1, 23.2 are arranged around the winding fork. In the present example, these sleeves are used to eject the finished roll from the winding fork, for example to a transfer station. In the present example, a winding fork 23.1 is shown in a retracted state and a second winding fork 23.2 is shown in an extended state. If the extended sleeve 23.2 curls around the winding fork 22, a roll formed on the winding fork 22 is ejected.

A suction drum 39, which also rotates parallel to the winding drum 16 and is positioned over the central drum axis 34 is driven by the same drum drive 31. The suction drum 39 comprises two rotary discs 35 arranged in parallel. Suction openings 33.1, 33.2 are provided on the rotary disc 35 facing the intermediate space between the suction drum 39 and the winding drum 16. Through this, an air flow by means of a blower 32 can take place via suction pipes 37.1, 37.2. In operation, the laminate strips or the rolls or already formed preforms have been provided with removal threads in the course of the tape feed. So that these retrieval threads can be kept out of the way during process operations, the suction pipes are provided in such a way that a constant suction is exerted on the rolls. The rolls therefore protrude essentially parallel to the axis of rotation R1 of the winding drum during the entire course of the process into the intermediate space between the winding drum 16 and the suction drum 39. This ensures that the removal threads do not interact undesirably with any moving parts.

Figure 5:
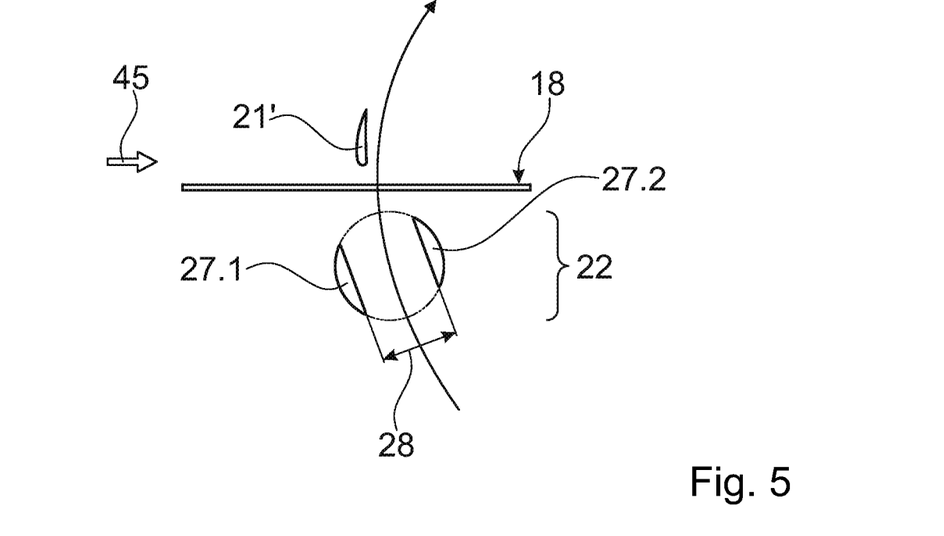
FIG. 5 shows an alternative embodiment of a guide bar.

FIG. 5 shows an alternative embodiment of a guide bar 21' which has a profile cross-section which has an end face with a substantially round surface. Overall, this alternative guide bar 21' is aligned as an airfoil. The position shown corresponds to the position in FIG. 3a, where the winding fork 22 enters the effective range of the guide bar 21' and the winding fork fingers 27.1, 27.2 pause the self-rotation of the winding fork in a position so that the guide bar passes without contact. A laminate strip 18 inserted in the direction of insertion of the drive roller (not shown) is located between the winding fork 22 and guide bar 21' and is then bent over and placed as a loop around a winding fork finger 27.1, so that it is wound up when the winding fork 22 resumes its self-rotation. The cross-sectional profile of the alternative guide bar 21' is designed to avoid creating a sharp edge and/or friction points with the laminate strip 18 as it is pulled away from the winding fork 22.

Figure 6:
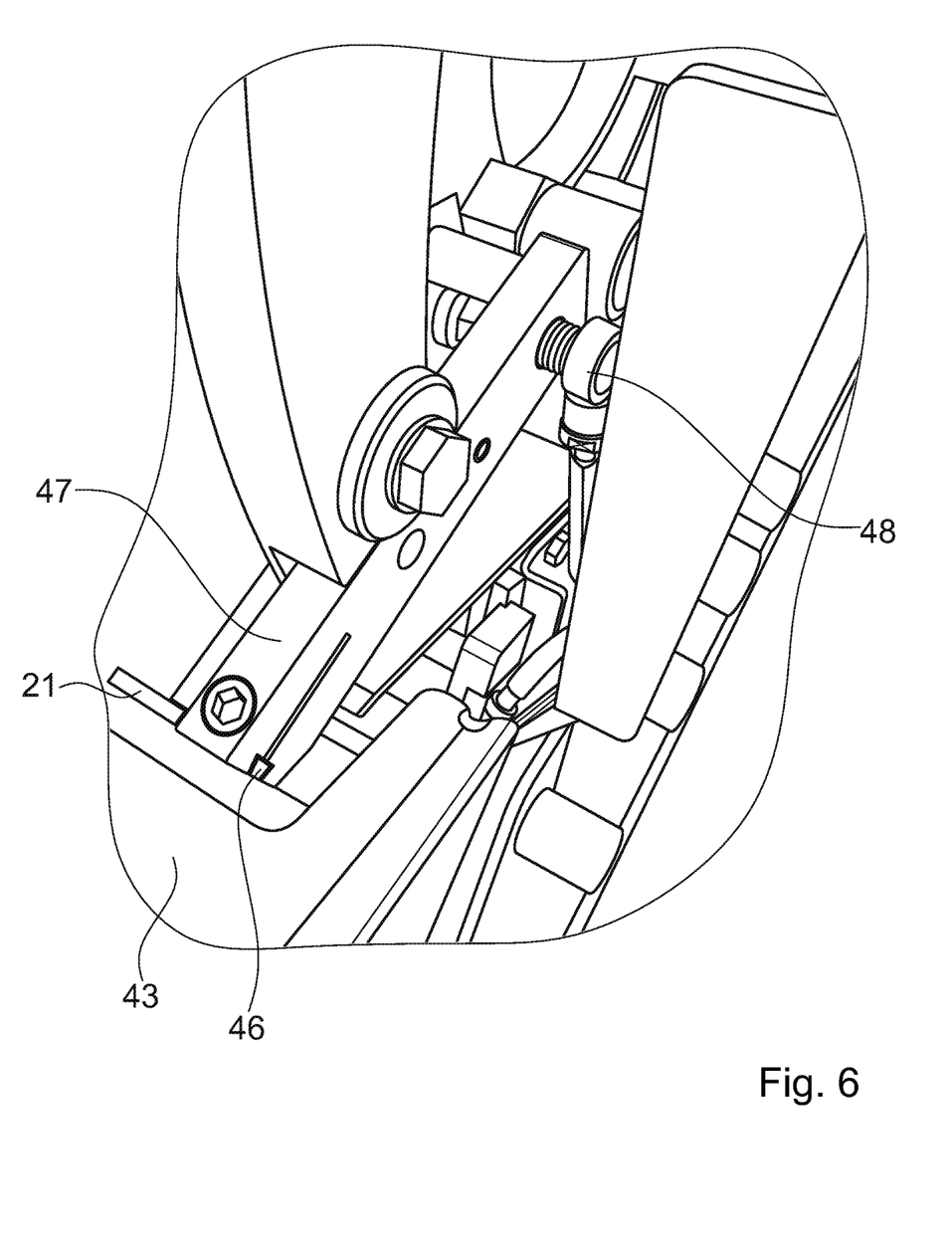
FIG. 6 shows an alternative embodiment as a movable guide bar.

In FIG. 6, an exemplary embodiment with a movable guide bar 21 is shown schematically. This arrangement could analogously replace the components 21, 42 and 41 in FIG. 2.

The guide bar 21 is non-positively and positively connected to a lever bar 47 via a wedge-shaped guide bar pin 46. The lever bar 27 has a complementary groove to the guide bar pin 46 for this purpose. The guide bar is fixed with a locking screw and a clamping slot. Overall, the guide bar is thus designed to be interchangeable. This has the advantage that the guide bar can be selected and thus adapted to different calibers of winding forks with different winding fork gaps.

The lever bar 47 can be driven eccentrically via a joint 48 so that it completes a stroke. This stroke is transformed into a back and forth movement of the guide bar, wherein the back and forth can be the direction of rotation of the winding forks. Thus, a stop-less stroke can be performed, which can be synchronized with the rotational speed of the winding forks. With the present invention, a method and a device for the production of preforms, namely wound laminate strips, are shown which can be operated continuously and enable a high process quality. In particular, very high process speeds can be made possible by the device according to the invention. By doing without intermittent transfer of the laminate strips, the energy-intensive stop-and-go operation of machine parts is reduced to such an extent that wear and tear of the individual parts is reduced and maintenance intervals are shortened.

LIST OF REFERENCE NUMERALS 1 device
2 backing material
3 layered material
4 backing material roll
5 layered material roll
6 guide roller
7.1 first draw roller
7.2 counter-pressure roller to the first draw roller
8 compensating roller
9 perforating unit
10 pressure roller
11 laminating unit
12 second draw roller
13 tape tension lever
14.1 conveyor roller
14.2 counter-pressure roller to conveyor roller
15 drive roller lever
16 winding drum
17 laminate tape
18 laminate strip
19 drive roller
20 counter-pressure roller to the drive roller
21 guide bar
21' alternative guide bar
22 winding fork
23 sleeve
24 rotary disc
25 guide plate
26 closing station
27 winding fork fingers
28 fork gap
29 direction of rotation of the winding fork
30 direction of rotation of the winding drum
31 drum drive
32 fan
33.1 suction opening
33.2 suction opening
34 drum axis
35 rotary discs of the suction drum
36 brace
37.1 suction pipe
37.2 suction pipe
38 sleeve mount
39 suction drum
40 deflection plate
41 web for guide bar
42 mount for guide bar
43 running plate
44 recess of the running plate
45 insertion direction of the drive roller
46 guide bar pin
47 lever bar
48 joint
R1 axis of rotation of the winding drum
R2 axis of rotation of the winding fork

The invention claimed is:

1. A method for winding preforms for manufacturing tampons, comprising the steps:
   a. feeding a material tape;
   b. separating tape-shaped material strips from the material tape;
      wherein
      a material strip is pushed into a continuously conveying winding unit by means of at least one drive roller in such a way that the material strip is positioned between a winding fork and a guide bar in such a way that when the winding fork moves around the guide bar, the latter pushes a section of the material strip into a fork gap.

2. The method of claim 1, wherein the material tape is designed as a laminate tape, further comprising the steps:
   a. feeding a backing material by means of at least one first draw roller;
   b. feeding a layered material by means of at least one second draw roller;
   c. bringing together the backing material and the layered material;
   d. laminating a laminate tape from the backing material and the layered material, wherein the step of separating tape-shaped material strips from the material tape comprises separating strip-shaped laminate strips from the laminate tape.

3. The method of claim 2, in which the layered material is perforated.

4. The method of claim 1, in which the conveying winding unit is a rotating winding drum on which the winding forks are arranged radially.

5. The method of claim 2, in which the backing material is perforated.

6. The method of claim 1, wherein the separation is performed by the drive roller and wherein a drive speed of the drive roller is higher than a conveying speed of the material tape on the upstream side of the drive roller.

7. The method of claim 1, wherein the winding fork passes the guide bar so that the material strip is threaded between the winding fork and guide bar.

8. The method of claim 1, in which a removal thread is wrapped around the material tape on the upstream side of the drive roller perpendicular to the longitudinal axis of the material tape.

9. The method of claim 1, wherein the material strip is wound by a rotational movement of the winding fork after a section of the material strip has been pressed into the fork gap.

10. The method of claim 9, wherein the wound material strip or laminate strip is closed by a closing station.

11. The method of claim 1, wherein the guide bar performs a movement counter to the direction of rotation of the winding fork and back.

12. The device of claim 11, wherein the winding drum comprises a closing station.

13. A device for winding preforms for manufacturing tampons for carrying out the method according to claim 1, comprising:
   a conveyor device for feeding in a material tape,
   a separating unit for separating tape-shaped material strips from a material tape,
   at least one drive roller for pushing the laminate strips into a winding unit,
   the winding unit comprising a plurality of winding forks which are arranged in such a way that they can be guided past a guide bar which is stationary or movable with respect to the movement of the winding forks in such a way that a laminate strip pushed into the winding unit is pressed by the guide bar into a fork gap of the winding forks, and is thus received by the winding fork.

14. The device according to claim 13, wherein the material tape is designed as a laminate tape, the conveyor device comprising:
   a. a first draw roller for feeding a backing material;
   b. a second draw roller for feeding a layered material; and
   c. a laminating unit for laminating a laminate tape from the backing material and the layered material.

15. The device of claim 14, wherein the device further comprises at least one respective guide roller for stabilizing the backing material, the layered material and the laminate tape, respectively.

16. The device of claim 13, wherein the winding unit is designed as a continuously rotatable, drum-like winding drum with radially arranged winding forks.

17. The device of claim 16, further comprising a guide curve along which the winding fork winds up the laminate strip in its movement along the rotational radius of the winding drum.

18. The device of claim 16, wherein the winding forks are arranged on the winding drum so as to be rotatable about their own longitudinal axis.

19. The device of claim 13, wherein the at least one drive roller is the separating unit.

20. The device of claim 13, wherein the guide bar is arranged stationary in the rotation radius of the winding forks on the winding drum, so that the guide bar can pass through the fork gap of the winding forks without contacting them on their rotation radius.

21. The device of claim 20, wherein the guide bar is designed to perform a stroke.

* * * * *